UNITED STATES PATENT OFFICE 2,574,950

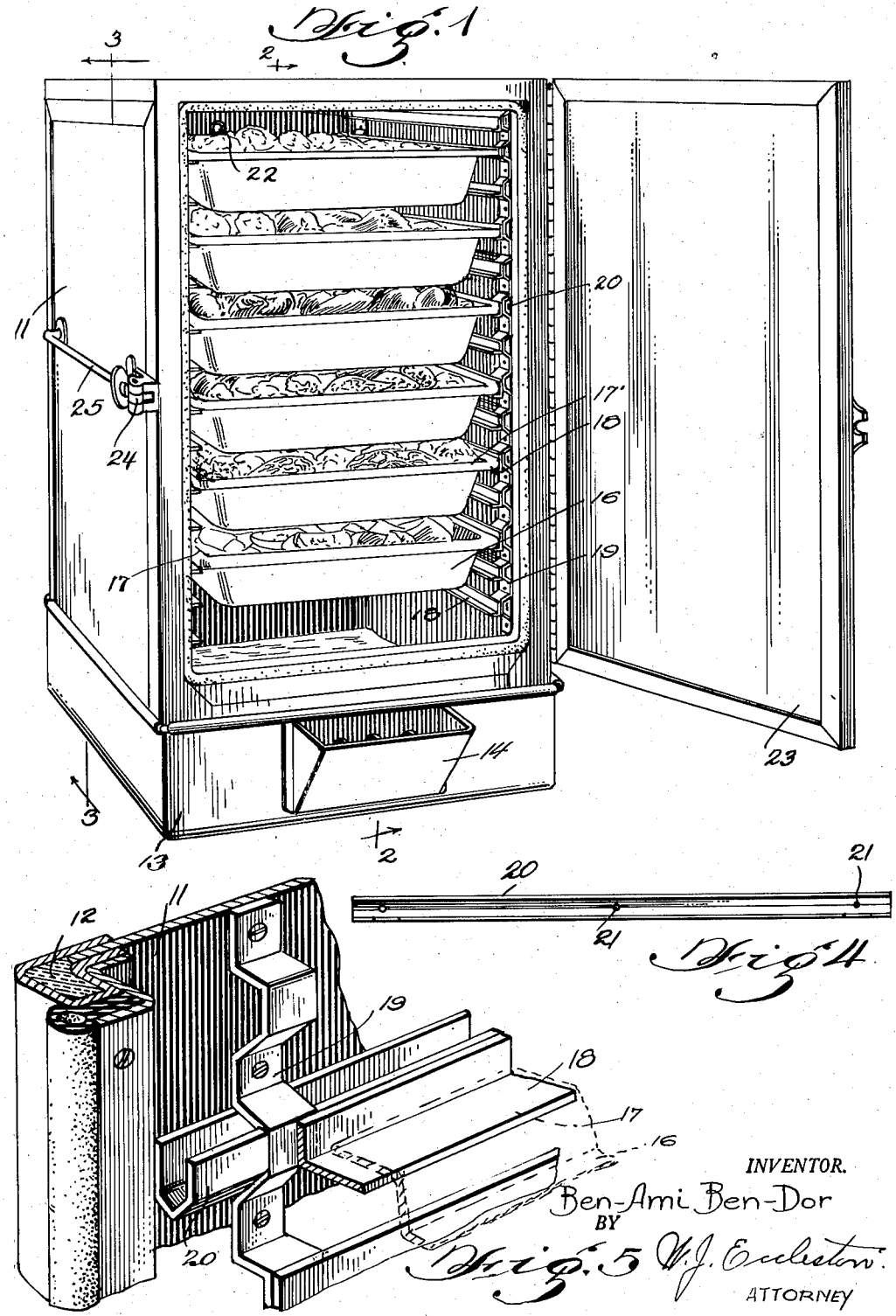

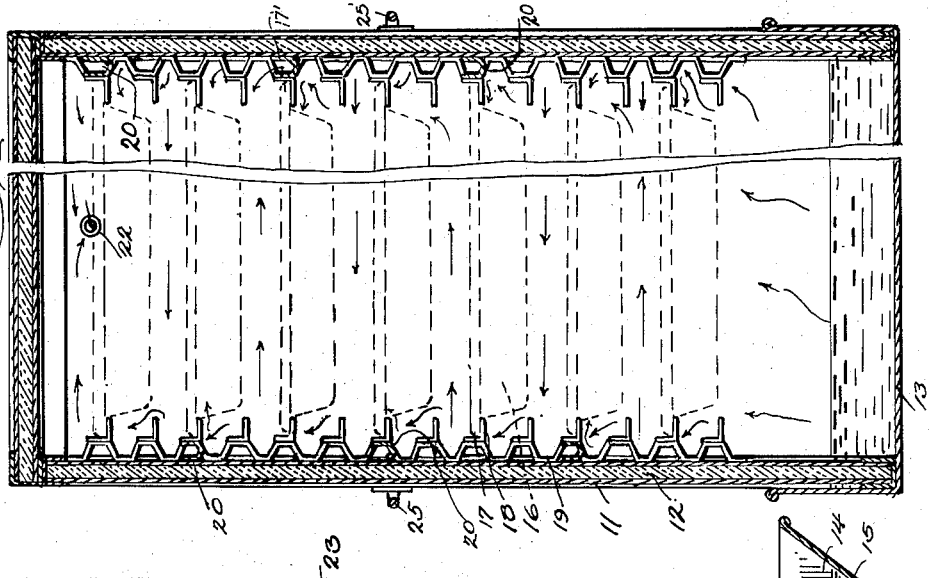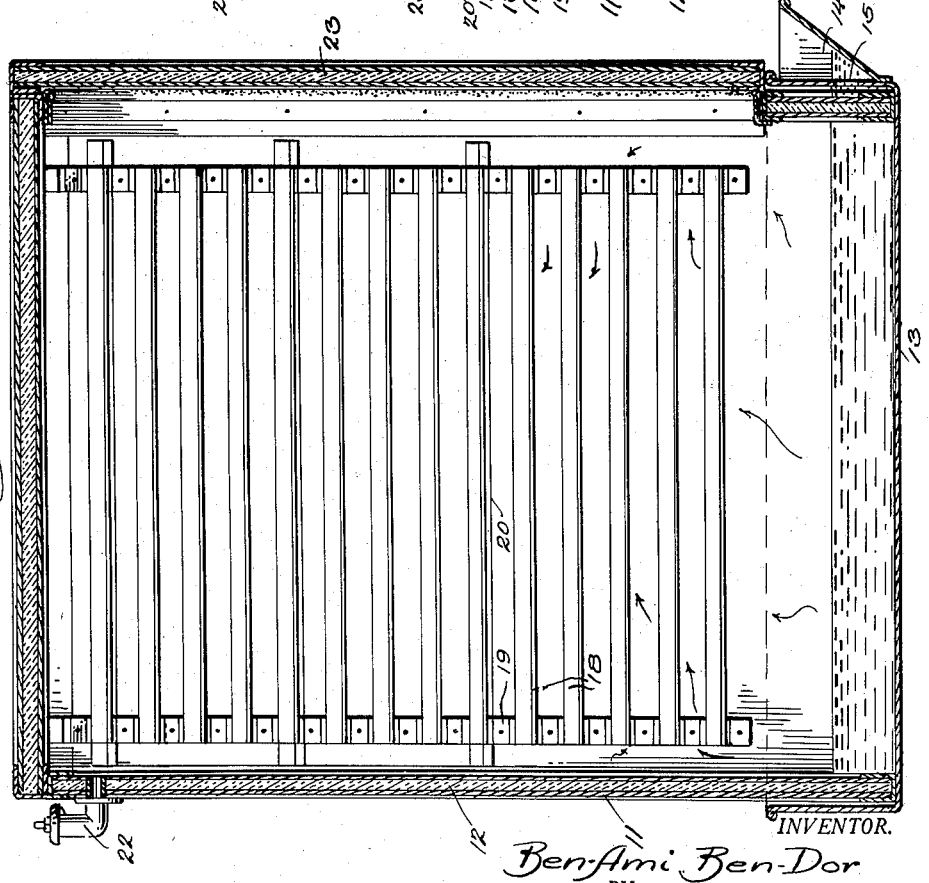

LOW-PRESSURE COOKER

Ben-Ami Ben-Dor, Washington, D. C.

Application June 29, 1948, Serial No. 35,957

5 Claims. (Cl. 126—369)

This invention relates to a low-pressure steam cooker, and particularly to that type wherein steam ascends in a cabinet in a zigzag path.

It is a well-known fact that steamed vegetables are more flavorful and retain their juiciness better than vegetables cooked in a water pan.

My invention therefore has as its principal object the provision of a steam cooker operating at or slightly above the vapor pressure of boiling water, and equipped with means for providing a zigzag path for ascending steam so as to bring the same into intimate contact with the food, and for return of water of condensation out of contact with the food.

Further objects and advantages of my invention are improvement of the appearance and enhancement of the nutritional value of the steamed food, and avoidance of the danger of overcooking, unevenly cooking or scorching the same; and simplicity, ease and efficiency of my apparatus, as well as its rugged construction capable of withstanding rough handling in transport, and its light weight which is due to the fact that its walls do not have to withstand high pressures.

Further objects and advantages of my invention will appear more fully from the following detailed description of a preferred embodiment thereof in connection with the appended drawings.

In the drawings:

Fig. 1 is a perspective view of a low-pressure steam cooker in accordance with my invention;

Fig. 2 is a sectional view, taken through lines 2—2 of Fig. 1 with the trays removed;

Fig. 3 is a sectional view taken through lines 3—3 of Fig. 1;

Fig. 4 is a plan view of one of the baffles in my steam cooker;

Fig. 5 is a detailed perspective view, partly in section, showing the manner in which a baffle is affixed to the cabinet of my low-pressure cooker.

More particularly, reference numeral 11 denotes a cabinet which is preferably, but not necessarily, provided with insulation means 12. The bottom portion of cabinet 11 interfits with a water reservoir pan 13, which is equipped with a filling spout 14. The opening leading from pan 13 to spout 14 may be closed in any well-known manner, e. g., by water lock 15; the water level in filled pan 13 extends to a height sufficient to close the apertured position of spout 14. Any available source of heat, including an open fire (not shown) may be used for vaporizing the contents of the water pan.

A plurality of vertically spaced food trays 16 are housed in the cabinet 11. Each tray 16 is provided with a pair of lateral elongated flanges 17, 17', for a purpose presently to be described.

Each tray 16 is supported by a pair of supports, preferably in the form of an elongated flange 18 of L-shaped cross-section, each of said supports being affixed to a cabinet side wall in spaced relation therefrom, e. g., by means of bracket 19. Thus, lateral steam passages are defined between opposite side walls of cabinet 11, and the flanged rims 17, 17' of trays 16, which are suspended from flanged supports 18.

In order to assure intimate contact between the steam ascending from water pan 13 and the food in trays 17, baffle plates 20 are positioned vertically above water pan 13 and interposed in vertically staggered relation between the side walls of the cabinet and the tray supports 18, and engaging them so as to define a zigzag path for the ascending steam, as is shown diagrammatically in Fig. 3. I prefer to support baffles 20 by the same bracket 19 which also supports a flange 18, as is shown in detail in Fig. 5.

Baffle plates 20 are troughed and provided with weep holes 21 for returning water of condensation from the top of the cabinet to the water pan without contacting the food contained in the trays. Weep holes 21 are sufficiently small to prevent the passage of any substantial amount of steam therethrough, so that the major volume of generated steam will follow the prescribed zigzag path around a baffle plate 20 and tray 16.

The top of cabinet 11 is equipped with a conventional valve 22, which may be set at or slightly above the vapor pressure of boiling water, to permit egress of the steam from the cabinet at such pressure.

The cabinet is accessible through door 23 which may be locked hermetically by means of lock 24. A pair of handles 25, 25' are provided for ease of transportation.

The operation of my low-pressure steam cooker is sufficiently apparent from the foregoing description of its component parts. When the water in water pan 13 is vaporized by application of heat thereto, steam ascends in a zigzag path to the top of the cabinet and intimately contacts the food prior to reaching the top. Water of condensation returns to the water pan through the weep holes of the baffles, without contacting the food, so as to insure that its flavor is not contaminated.

It will, of course, be understood that the foregoing preferred embodiment of my invention is susceptible of modifications of its proportions, and of other structural changes, without departing from the spirit of my invention. I intend to comprise any such changes and modifications, which will readily occur to the expert, within the scope of my invention, and therefore define the latter by the appended claims.

I claim:

1. A low-pressure steam cooker comprising a cabinet including a water reservoir, a plurality of vertically spaced trays, means affixed to opposite side walls of said cabinet in horizontally spaced relation to said walls for supporting said trays and defining steam passages between said trays and said walls, a plurality of troughed baffle plates in vertically staggered relation, each of said baffle plates engaging one of said side walls and one of said tray supporting means for defining a zigzag path for steam ascending in said cabinet through the unobstructed spaces between said trays and side walls, said baffle plates being perforated for returning water of condensation to said water reservoir in a path parallel to said side walls and out of contact with said trays, said baffle plates being positioned vertically above said water reservoir, and means for discharging said steam from said cabinet.

2. A low-pressure steam cooker comprising a cabinet including a water reservoir, a plurality of vertically aligned spaced trays, means affixed to opposite side walls of said cabinet in horizontally spaced relation to said walls for supporting said trays and defining steam passages between said trays and said walls, a plurality of troughed baffle plates in vertically staggered relation, each of said baffle plates engaging one of said side walls and one of said tray supporting means for defining a zigzag path for steam ascending in said cabinet through the unobstructed spaces between said trays and side walls, said baffle plates being perforated for returning water of condensation to said water reservoir in a path parallel to said side walls and out of contact with said trays, said baffle plates being positioned vertically above said water reservoir, and means for discharging said steam from said cabinet.

3. A low-pressure steam cooker comprising a cabinet including a water reservoir, vertically spaced flanged trays in said cabinet, means affixed to opposite side walls of said cabinet for suspending said flanged trays in horizontally spaced relation to said walls and for defining steam passages between said trays and said walls, a plurality of troughed baffle plates in vertically staggered relation, each of said baffle plates engaging one of said side walls and one of said tray suspension means for defining a zigzag path for steam ascending in said cabinet through the unobstructed spaces between said trays and side walls, and said baffle plates being perforated for returning water of condensation to said water reservoir in a path parallel to said side walls and out of contact with said trays, said baffle plates being positioned vertically above said water reservoir, and means for discharging said steam from said cabinet.

4. A low-pressure steam cooker comprising a cabinet including a water reservoir, a plurality of vertically spaced flanged trays in said cabinet, elongated flanges affixed to opposite side walls of said cabinet in horizontally spaced relation to said walls for suspending said trays, a plurality of troughed baffle plates in vertically staggered relation, each of said baffle plates engaging one of said side walls and one of said elongated flanges for defining a zigzag path for steam ascending in said cabinet through the unobstructed spaces between said trays and side walls, said baffle plates being perforated for returning water of condensation to said water reservoir in a path parallel to said side walls and out of contact with said trays, said baffle plates being positioned vertically above said water reservoir, and means for discharging said steam from said cabinet.

5. A low-pressure steam cooker comprising a cabinet including a water reservoir, a plurality of vertically aligned spaced flanged trays in said cabinet, elongated flanges affixed to opposite side walls of said cabinet in horizontally spaced relation to said walls for suspending said trays, a plurality of troughed baffle plates in vertically staggered relation, each of said baffle plates engaging one of said side walls and one of said elonagted flanges for defining a zigzag path for steam ascending in said cabinet through the unobstructed spaces between said trays and side walls, said troughed baffle plates including means disposed vertically above said water reservoir for returning water of condensation to said water reservoir in a path parallel to said side walls and out of contact with said trays, and means for discharging said steam from said cabinet.

BEN-AMI BEN-DOR.

REFERENCES CITED

The following references are of record in the file of this patent:

UNITED STATES PATENTS

| Number | Name | Date |
|---|---|---|
| 560,336 | Willson | May 19, 1896 |
| 848,906 | Johns | Apr. 2, 1907 |
| 1,472,693 | Splithoff | Oct. 30, 1923 |
| 1,535,465 | Hackman | Apr. 28, 1925 |
| 2,464,573 | Helm | Mar. 15, 1949 |

FOREIGN PATENTS

| Number | Country | Date |
|---|---|---|
| 201 | Austria | Sept. 25, 1899 |